(12) United States Patent
Plotkin

(10) Patent No.: US 6,178,923 B1
(45) Date of Patent: Jan. 30, 2001

(54) SYSTEM AND METHOD FOR MAKING LIVE ANIMALS APPEAR TO TALK

(76) Inventor: Robert A. Plotkin, c/o Madelyn S. Fudeman, Esq., Desantis, Desantis & Essig, 708 Centre Ave., P.O. Box 14926, Reading, PA (US) 19612-4926

( * ) Notice: Under 35 U.S.C. 154(b), the term of this patent shall be extended for 0 days.

(21) Appl. No.: 09/313,644

(22) Filed: May 18, 1999

(51) Int. Cl.[7] ................................................. A01K 29/00
(52) U.S. Cl. ........................................ 119/719; 119/859
(58) Field of Search ..................................... 119/792, 719, 119/858, 859; 340/573.1, 573.3; 446/297

(56) References Cited

U.S. PATENT DOCUMENTS

| | | |
|---|---|---|
| 3,870,296 | 3/1975 | Ellis . |
| 4,681,303 | 7/1987 | Grassano . |
| 4,745,882 | 5/1988 | Yarnall, Sr. et al. . |
| 4,967,696 | 11/1990 | Tobias . |
| 5,045,327 | 9/1991 | Tarlow et al. . |
| 5,217,379 * | 6/1993 | Kirschenbaum et al. ........... 434/236 |
| 5,316,515 | 5/1994 | Hyman et al. . |
| 5,337,041 * | 8/1994 | Friedman .............................. 340/573 |
| 5,351,653 | 10/1994 | Marischen et al. . |
| 5,355,839 * | 10/1994 | Mistry .................................... 119/858 |
| 5,407,376 | 4/1995 | Avital et al. . |
| 5,494,002 | 2/1996 | Greene . |
| 5,509,859 | 4/1996 | Klees et al. . |
| 5,752,335 | 5/1998 | Shimogori et al. . |
| 5,775,970 | 7/1998 | Klees et al. . |
| 5,955,953 * | 9/1999 | Hanson et al. ..................... 340/573.3 |
| 6,003,473 * | 12/1999 | Printz .................................... 119/859 |

* cited by examiner

Primary Examiner—Peter M. Poon
Assistant Examiner—Yvonne Abbott
(74) Attorney, Agent, or Firm—Nixon & Vanderhye P.C.

(57) ABSTRACT

A system and method for making animals appear to talk is provided. The system includes a speaker mounted on an article (such as a collar) worn by the animal. A memory stores a plurality of pre-recorded messages. These pre-recorded messages may be generic phrases to be "spoken" by all types of animals or may be messages which are based on the characteristics of a particular animal. Using a selection circuit, a user is able to selectively output the pre-recorded messages from the memory to the speaker, thereby making the animal appear to talk.

20 Claims, 2 Drawing Sheets

SYSTEM AND METHOD FOR MAKING LIVE ANIMALS APPEAR TO TALK

BACKGROUND OF THE INVENTION

1. Field of the Invention

The present invention relates to a system and method for making live animals appear to talk.

2. Description of the Prior Art

Various arrangements are known in the art for producing sounds from toys such as stuffed animals. For example, U.S. Pat. No. 5,775,970 to Klees et al. discloses a toy leash with an adjustable harness, electronic sound and a light which is attachable to one of a number of toy animals. Housed within a handle connected to the leash are a battery and integrated circuit or chip for generating various electronic sound signals such as for a barking dog, a meowing cat, roaring lion or tiger, growling bear or the like. The appropriate sound signal is generated using one or more selector switches.

U.S. Pat. No. 5,509,859 to Klees et al. discloses a novelty item for creating the illusion of an imaginary pet. Mounted within the collar end of the leash is a micro speaker which is connected by wiring through a hollow leash to circuitry in the handle. The circuitry includes a conventional sound producing circuit for a plurality of simulated synthetic animal sounds such as a friendly dog bark, a mean dog growl, a friendly cat meow, and a scary cat hiss. One of these sounds is selected by appropriately depressing selector switches.

SUMMARY OF THE INVENTION

The present invention relates to a system for making a live animal appear to talk. The system has particular utility with household pets such as dogs and cats, although the invention is not limited in this respect. The system includes a speaker mounted on an article (such as a collar) worn by the animal. A memory stores a plurality of pre-recorded messages. These pre-recorded mesages may be generic messages to be "spoken" by all types of animals or may be messages which are based on the characteristics (e.g., type, breed, size, age) of a particular animal. Using a selection circuit, a user is able to selectively output the pre-recorded messages from the memory to the speaker, thereby making the animal appear to talk. The selection circuit, the memory and a control circuit for causing the pre-recorded messages to be output from the memory to the speaker may be part of a system control panel. This control panel may be conveniently attached to the handle of a leash which is secured to a collar worn by the animal.

The system may be configured so that the memory stores two or more pre-recorded messages constituting a conversation. The system may also be provided with a second speaker. This speaker may be arranged, for example, in the control panel or on an article worn by another animal. Using the selection circuit, the user may select the messages constituting the conversation for output to the two speakers. The selection circuit may be arranged so that a single input results in the output of all of the messages constituting the conversation from the memory to the speakers and the control circuit may be arranged to direct each message to the appropriate one of the speakers. In this way, the animal can appear be involved in "conversations" either with its owner or with another animal.

The system may also be provided with one or more sensors for sensing a parameter such as air temperature. The sensed parameter may be used, at least in part, to select a pre-recorded message for output from the memory. Thus, for example, the animal can appear to be talking about current weather conditions.

The system may still further be provided with a timer. The control circuit is responsive to the timer for periodically (either at regular or irregular intervals) automatically outputting one of the pre-recorded messages from the memory.

BRIEF DESCRIPTION OF THE DRAWINGS

These, as well as other objects and advantages of this invention, will be more completely understood and appreciated by careful study of the following more detailed description of a presently preferred exemplary embodiment of the invention taken in conjunction with the accompanying drawings, of which.

DETAILED DESCRIPTION

Figure 1:
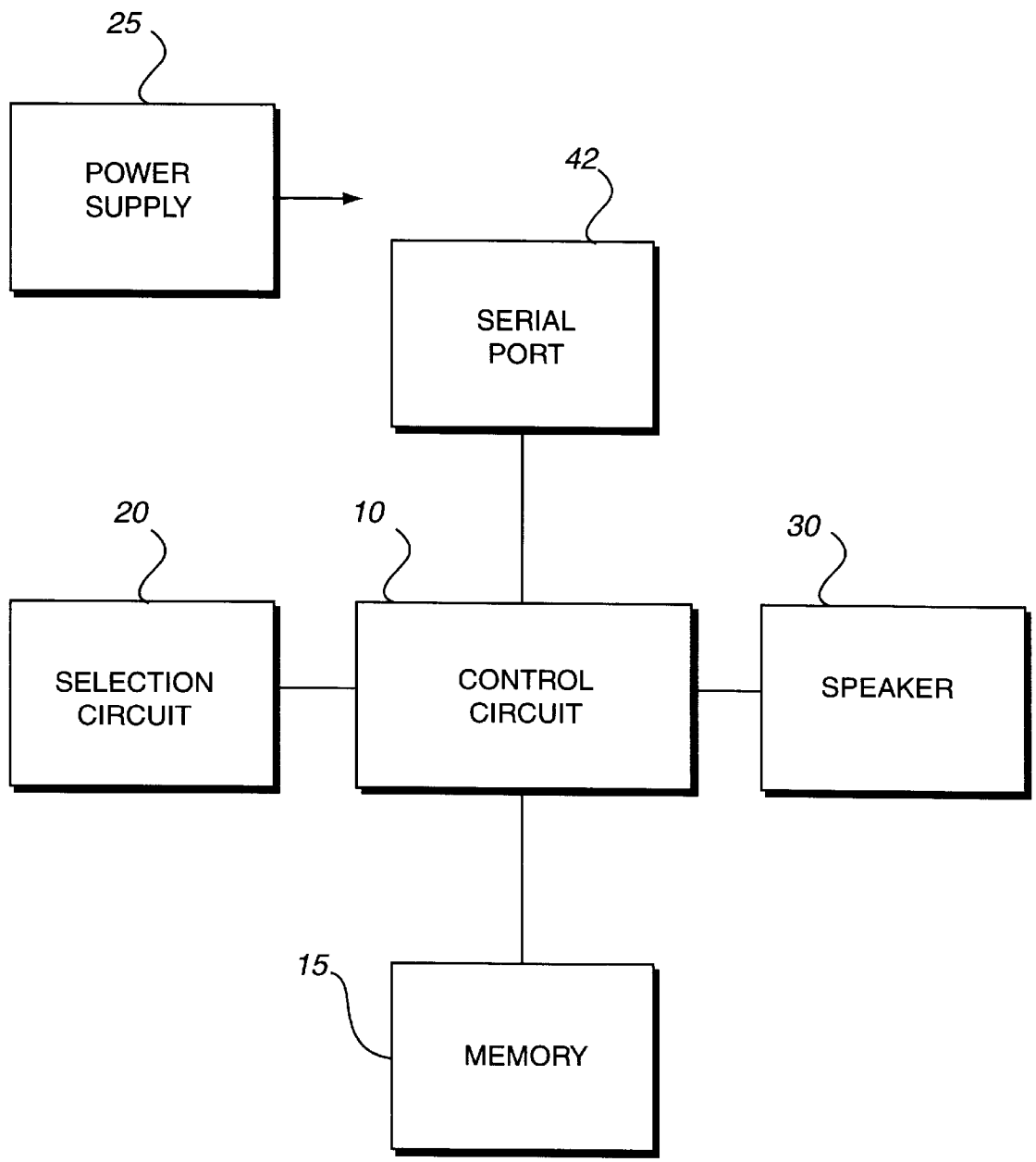
FIG. 1 is a block diagram showing the elements of the present invention.

FIG. 1 is a block diagram showing a system in accordance with the present invention. The system includes a control circuit 10 such as a microprocessor, a memory 15, a selection circuit 20, a power supply 25, a speaker 30 and an optional serial port 42. Memory 15 is preferably a non-volatile memory and stores a plurality of pre-recorded spoken messages as will be explained in greater detail below. Selection circuit 20 permits a user to make selections including selections of one of the plurality of pre-recorded spoken messages from memory 15 for output by speaker 30 via a digital-to-analog converter (not shown).

The selection circuit 20 may comprise, for example, buttons or keys. These buttons or keys may be actuated individually or in combination to make selections including selections of a particular one of the pre-recorded spoken messages. The buttons or keys may include captions, labels or other indicia to assist the user in making selections. The selection circuit 20 may alternatively comprise a touch-sensitive display screen. In this case, the selections are made by touching a designated area or areas of the display screen. The designated area or areas may include captions, labels or other indicia to assist the user in making selections. The selection circuit 20 may comprise any combination of keys, buttons and a touch-sensitive display screen. Of course, the selection circuit 20 may be as simple as a single key or button that, in response to successive actuations, causes the output of the pre-recorded messages from memory 15 to speaker 30 in a random or in a pre-determined sequence.

Power supply 25 (such as one or more batteries) supplies power to the control circuit 10 and to any other components (e.g., a touch-sensitive display screen) requiring power.

Figure 2:
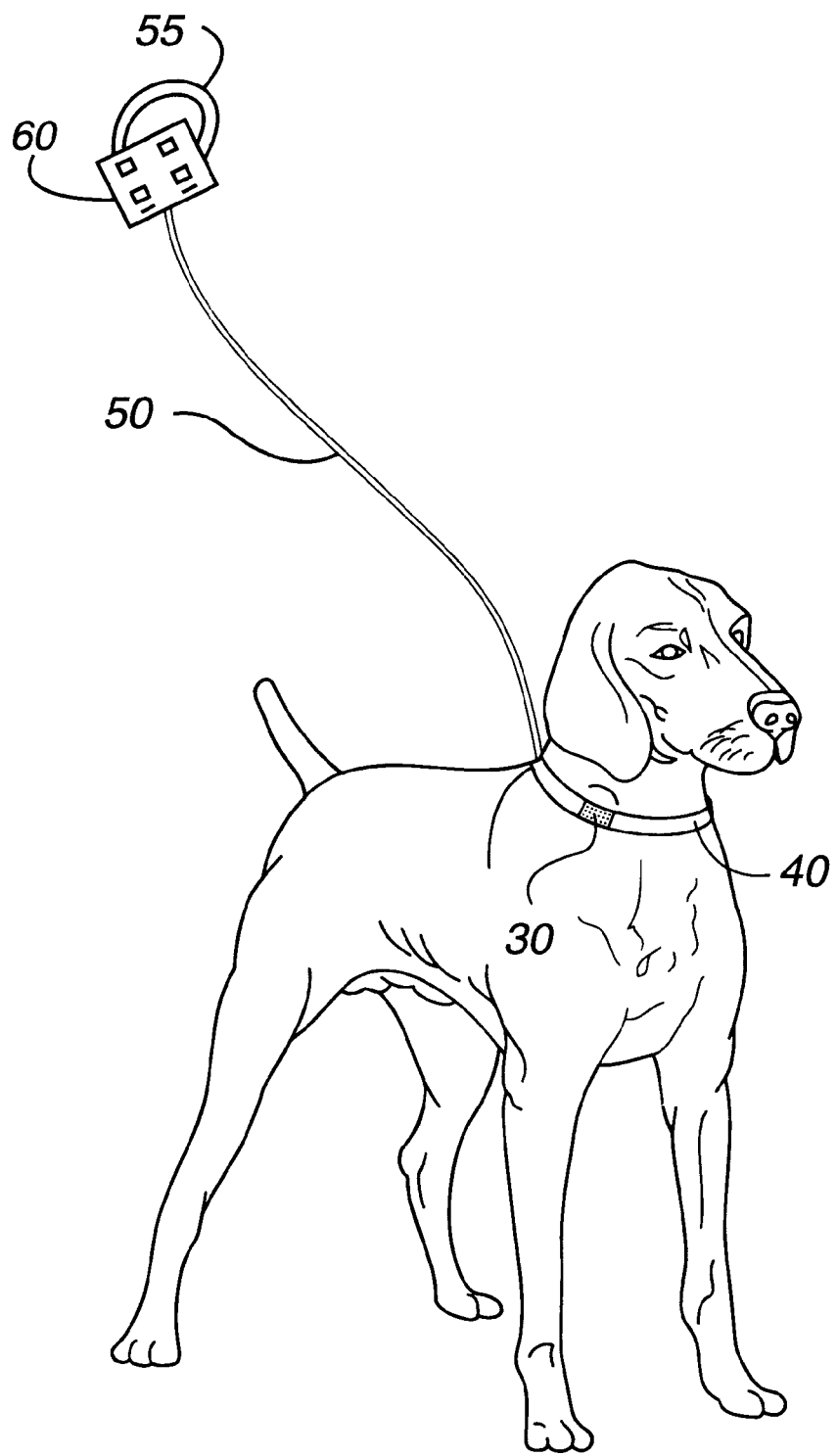
FIG. 2 shows an implementation of an embodiment of the present invention.

FIG. 2 shows an implementation of the above system in accordance with an embodiment of the present invention. In this embodiment, the speaker 30 is attached to a collar 40 worn by a dog. One end of a leash 50 is attached to the collar 40. The other end of the leash 50 has a handle that is grasped by a person to restrain the dog when the dog is, for example, being walked. A control panel 60 is attached in any convenient manner to the handle 55. Control panel 60 accommodates the control circuit 10, memory 15, selection circuit 20 and power supply 25. Control panel 60 also includes a volume control (not shown) for controlling the volume of the speaker output. Other controls such as bass and treble may be provided, if desired, as is known in the art. Of course, various ones (or even all) of the components (e.g., control circuit 10 and memory 15) may be configured for attachment to collar 40 along with speaker 30 and the present invention is not limited in this respect.

Control panel 60 and speaker 30 are connected via a wired path. The wire may be located in the body of the leash or may be secured to or wrapped around the outside of the body of the leash. Alternatively, the control panel and the speaker may be connected via a wireless link. The use of a wireless link provides greater flexibility with respect to the positioning of the control panel, which of course is not limited to a position in which it is attached to handle 55.

The collar and leash combination may be unitary or the leash may be detachably coupled to the collar by using a coupling mechanism. In the case of the detachable coupling, the speaker and the control panel may be connected over a wireless link or the end of the wire that connects the control panel to the speaker may be provided, for example, with a plug which is plugged into a jack connected to the speaker.

Memory 15 may be configured in various ways. For example, memory 15 may be a memory which stores pre-recorded messages for a particular type or breed of animal. Thus, memory 15 may store a set of pre-recorded generic messages for a dog or a set of pre-recorded messages for a cat. Alternatively, memory 15 may store a set of pre-recorded messages created for a particular breed of animal such as a French poodle or a Siamese cat.

Memory 15 may also be configured to store pre-recorded messages for a plurality of different types and/or breeds of animals. Using the selection circuit 20, the user may initially select a particular type and/or breed of animal. After making this selection, the system allows the user to select from among the pre-recorded messages appropriate for use with an animal of the selected type and/or breed. Thus, the system is user configurable and the same system may be easily adapted for use with many different types and breeds of animals.

Memory 15 may also be configured as a portable memory module adapted to be removably attachable to the control panel 60 via a memory module port (not shown). The user uses the selection circuit 20 to selectively output pre-recorded messages from among the pre-recorded messages on the portable memory module. Different portable memory modules will store messages for animals of different types and breeds. For example, one portable memory module may store generic messages for any type of dog; another portable memory module may store generic messages for any type of cat; and still another portable memory module may store messages for a particular type of dog (e.g., a French poodle). It will be apparent that the use of portable memory modules provides a system which may be easily adapted for use with pets of different types (e.g., cats and dogs) or breeds (e.g., bulldogs and French poodles).

The system may also be configured for connection to a computer via serial port 42. Using this connection, memory 15 may be loaded or updated with pre-recorded messages stored by or accessible to the computer. For example, the memory of the computer may contain various pre-recorded messages. The pre-recorded messages may be loaded into the memory of the computer from a disk provided to the user when the system is purchased. Using the computer, the user may then select certain ones of these pre-recorded messages for loading into the memory 15 via serial port 42. In another implementation, the computer may be connected to a particular web site using conventional browser software. The web site provides various pre-recorded messages which may be selected for loading into the memory 15 via serial port 42. The pre-recorded messages on the web site may be organized according to animal type, breed, size, age, etc. This arrangement permits a user to select pre-recorded messages from among a large number of messages, as well as easy adaptation of the system to pets of different types or breeds and to the preferences of a particular user. The computer may also be used by the user to record his or her own messages using conventional equipment and software. These recorded messages may likewise be loaded into memory 15 via serial port 42.

The messages stored in memory 15 comprise of one or more spoken words and may be in any language, accent or voice type. It is also contemplated that the messages may comprise songs or parts of songs which can be accompanied or unaccompanied by appropriate background music. As noted above, the messages may be generic to all pets or may be tailored to specific types of pets or to specific breeds of a particular type of pet. An example of a generic message that may be pre-recorded in memory 15 for a pet dog is: "It's a dog eat dog world out there." An example of a generic message that may be pre-recorded for a pet cat is: "I want to be left alone." If desired, this message may be recorded with a Greta Garbo-like accent. Messages specific to a particular breed may also be pre-recorded. For example, a message for a boxer might be: "You should see the other guy." A message for a Doberman might be: "I'm not looking for any trouble." Messages for a French poodle may be recorded with a French accent.

It will be apparent that the content and characteristics (e.g., accents, high pitch voice, low pitch voice, etc.) of the pre-recorded messages are limited only by the imagination of the person making the recordings and by the intended audience. Thus, certain messages may be developed for a humorous or amusing effect while walking a dog around the neighborhood. In another implementation, certain messages may be developed for use with animals in a zoo. More particularly, a speaker may be attached to an article worn by an animal in a zoo. A visitor to the zoo may use a control panel (mounted for example adjacent to the animal's enclosure and configured for wireless transmissions to the speaker) to cause the speaker worn by the animal to selectively output pre-recorded messages. There may, for example, be a set of pre-recorded messages which are suitable for use with children. For example, the messages may include statements of the type of animal, the animal's name, how old the animal is, what the native habitat of the animal is, and the like. With appropriate inputs to the selection circuit, the user can select certain ones of these messages to be output from the speaker worn by the animal. Such a system would be particularly advantageous in a petting zoo for small children.

Those skilled in the art will readily understand that the functionality described herein can be achieved through the use of different components and the particularly circuitry associated with the control circuit 10, memory circuit 15, selection circuit 20 and/or control panel 60 can have many variations. Those skilled in the art will understand how the system of the present invention can be constructed in light of this disclosure and general knowledge in the industry. In addition, various technologies exist for recording spoken or sung messages in a format suitable for storage in a memory and those skilled in the art will readily understand how these technologies may be used in the system described herein.

In another implementation of the present invention, a second speaker is provided. This speaker may be provided, for example, in the leash handle or on the control panel. In this way, the pet can be involved in "conversations". In this implementation, the memory 15 may store pre-recorded messages that simulate a conversation (e.g., questions and answers or a series of comments about a particular topic). Using the selection circuit, the user may select the messages constituting the conversation for output to the speakers. The selection circuit may be arranged so that a single input results in the output of all of the messages of the conversation from the memory to the speaker and the control circuit may be arranged to direct each of the messages to the appropriate one of the speakers. In a variation of this implementation, the second speaker may be provided on an article worn by another animal or pet. In this way, two animals or pets can appear to be involved in a conversation.

In still another implementation, one or more sensors may be incorporated in or connected to control panel 60 for sensing parameters such as air temperature and the messages spoken by the pet may be determined, at least in part, based on the sensed parameter(s). For example, on a particularly cold day (e.g., one on which the temperature is below some predetermined temperature), the selection circuit may permit the user to select a pre-recorded message such as: "It's not fit for man nor beast." A sensor may also be provided to sense certain sounds or even words. For example, a sensor may be provided to sense a series of barks by a dog. In response to the sensing of this series of barks, the control circuit 10 may automatically cause the message "Don't make me come over there" to be output via speaker 20.

In a still further implementation, control circuit 10 may be responsive to a timer for periodically automatically outputting one of the pre-stored messages. The timer may be set by the user using the control panel 60 to thereby automatically output one of the pre-stored messages at regular or irregular intervals. The messages may be output randomly, in a predetermined sequence or in a sequence determined by the user.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for making a live animal appear to talk, the system comprising:
    a first speaker mounted on an article worn by the animal;
    a memory for storing pre-recorded phrases;
    a selection circuit configured to receive user-supplied inputs; and
    a control circuit responsive to the user-supplied inputs for selectively outputting the pre-recorded phrases from said memory to said first speaker thereby making the animal appear to talk.

2. The system according to claim 1, wherein the pre-recorded phrases stored in said memory are based on the characteristics of the animal.

3. The system according to claim 1, further comprising a second speaker.

4. The system according to claim 3, wherein said memory stores two or more phrases constituting a conversation and said control circuit is responsive to the user-supplied inputs for supplying the phrases constituting the conversation to said first and second speakers.

5. The system according to claim 1, wherein said first speaker is connected to said control circuit over a wireless communication link.

6. The system according to claim 1, further comprising:
    a sensor,
    wherein said control circuit is responsive to a parameter sensed by said sensor for automatically outputting a pre-recorded phrase from said memory to said first speaker.

7. The system according to claim 6, wherein said parameter senses temperature.

8. The system according to claim 1, further comprising:
    a timer,
    wherein said control circuit is responsive to said timer for periodically automatically outputting a pre-recorded phrase from said memory to said first speaker.

9. The system according to claim 1, wherein said selection circuit comprises a touch-sensitive display screen.

10. The system according to claim 1, wherein said memory comprises a portable memory module.

11. The system according to claim 1, wherein said memory is adapted to have its contents updated by connection to a computer.

12. A system for making a pet appear to talk, the system comprising:
    a leash member for restraining the pet;
    a collar attached to one of said leash;
    a speaker mounted on said collar;
    a control panel including a memory for storing a plurality of pre-recorded phrases, a selection circuit for receiving user-supplied inputs and a control circuit responsive to the user-supplied inputs for selectively outputting the pre-recorded phrases from said memory to said speaker thereby making the pet appear to talk.

13. The system according to claim 12, wherein a handle is disposed at the other of said leash and said control panel is secured to said handle.

14. The system according to claim 12, wherein said control panel is connected to said speaker via a wireless link.

15. The system according to claim 12, wherein said memory comprises a portable memory module.

16. The system according to claim 12, wherein the pre-recorded phrases stored in said memory are based on the characteristics of the pet.

17. The system according to claim 12, further comprising:
    a sensor,
    wherein said control circuit is responsive to a parameter sensed by said sensor for automatically outputting a pre-recorded phrase from said memory to said speaker.

18. The system according to claim 12, further comprising:
    a timer,
    wherein said control circuit is responsive to said timer for periodically automatically outputting a pre-recorded phrase from said memory to said first speaker.

19. A method of making an animal appear to talk, comprising:
    storing in a memory a plurality of pre-recorded phrases, the pre-recorded phrases being based on characteristics of the animal;
    attaching a speaker to the animal;
    using a selection circuit configured to receive user supplied inputs to select one of the pre-recorded phrases from said memory for output to the speaker, whereby the animal appears to talk.

20. The method according to claim 19, further comprising:
    storing in said memory two or more pre-recorded phrases constituting a conversation;
    attaching another speaker to another animal; and
    selecting the phrases constituting the conversation from said memory for output to the speakers, whereby the animals appear to converse with each other.

* * * * *